US012324782B2

(12) United States Patent
Wang

(10) Patent No.: US 12,324,782 B2
(45) Date of Patent: Jun. 10, 2025

(54) SEX TOY

(71) Applicant: Dongguan Mimao Electronic Technology Co., Ltd., Guangdong (CN)

(72) Inventor: Qinling Wang, Guangdong (CN)

(73) Assignee: Dongguan Mimao Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/954,449

(22) Filed: Nov. 20, 2024

(65) Prior Publication Data

US 2025/0161152 A1 May 22, 2025

Related U.S. Application Data

(63) Continuation-in-part of application No. 18/516,984, filed on Nov. 22, 2023, now Pat. No. 12,161,598.

(51) Int. Cl.
*A61H 19/00* (2006.01)

(52) U.S. Cl.
CPC ..... *A61H 19/32* (2013.01); *A61H 2201/0153* (2013.01); *A61H 2201/123* (2013.01); *A61H 2201/1692* (2013.01)

(58) Field of Classification Search
CPC ............ A61H 19/32; A61H 2201/0153; A61H 2201/123; A61H 2201/1692
See application file for complete search history.

(56) References Cited

U.S. PATENT DOCUMENTS 7,153,282 B1 * 12/2006 Dudley .................. A61H 7/004 601/93
7,434,581 B1 * 10/2008 Reddy ....................... A61F 6/04 604/347
9,138,373 B2 * 9/2015 Caropelo ............... A61H 19/30
11,369,545 B1 * 6/2022 He ......................... A61H 7/005
11,491,078 B1 * 11/2022 He ......................... A61H 7/005
11,554,073 B1 * 1/2023 Guo ....................... A61H 7/005
11,633,327 B1 * 4/2023 Wu .................... A61H 23/0263 601/70
11,752,063 B1 * 9/2023 Huang .................. A61H 19/32 600/38

(Continued)

FOREIGN PATENT DOCUMENTS

CN 104352254 A 2/2015
CN 106344382 A 1/2017

(Continued)

OTHER PUBLICATIONS

Notice of Refusal Dated Dec. 17, 2024 for Corresponding Japan Application No. 2024-201869.

(Continued)

*Primary Examiner* — Garrett K Atkinson

(57) ABSTRACT

A sex toy having a stimulation chamber extending along longitudinal direction for accommodating a male penis includes at least two massage arms and a drive assembly. The at least two massage arms include a first massage arm and a second massage arm respectively arranged on opposite sides of the stimulation chamber. The drive assembly is in torque-transmission connection with the at least two massage arms, for driving the first massage arm and the second massage arm to slide towards or away from each other, thereby changing a radial dimension of the stimulation chamber at a portion corresponding to the first massage arm and the second massage arm.

20 Claims, 14 Drawing Sheets

(56) References Cited

U.S. PATENT DOCUMENTS

| | | | | |
|---|---|---|---|---|
| 11,806,306 | B1 * | 11/2023 | Guo | A61H 7/007 |
| 2008/0009775 | A1 * | 1/2008 | Murison | A61H 19/44 600/38 |
| 2015/0065792 | A1 | 3/2015 | Levine | |
| 2016/0354277 | A1 * | 12/2016 | Fima | A61H 19/44 |
| 2017/0173262 | A1 * | 6/2017 | Veltz | G16H 20/17 |
| 2019/0110948 | A1 * | 4/2019 | Bradbury Goulsby | A61H 1/0244 |
| 2019/0125624 | A1 * | 5/2019 | DeVore | A61H 19/32 |
| 2019/0240109 | A1 | 8/2019 | Barkay | |
| 2020/0046599 | A1 * | 2/2020 | Sedic | A61F 5/41 |
| 2020/0368103 | A1 | 11/2020 | Rakshit | |
| 2021/0196556 | A1 * | 7/2021 | Fuster | A61H 7/008 |

FOREIGN PATENT DOCUMENTS

| | | | |
|---|---|---|---|
| CN | 107551410 | A | 1/2018 |
| CN | 210872865 | U | 6/2020 |
| CN | 211584149 | U | 9/2020 |
| JP | 2010125335 | A | 6/2010 |
| JP | 2020081721 | A | 6/2020 |
| KR | 101310270 | B1 | 9/2013 |
| WO | 2023194974 | A1 | 10/2023 |

OTHER PUBLICATIONS

Notice of Refusal Dated Jan. 28, 2025 for Corresponding Japan Application No. 2024-203424.

Notice of Refusal Dated Feb. 18, 2025 for Corresponding Japan Application No. 2024-202360.

Written Opinion of the International Searching Authority Dated Mar. 19, 2025 for Corresponding PCT Application PCT/CN2024/134000.

International Search Report Dated Mar. 19, 2025 for Corresponding PCT Application PCT/CN2024/134000.

Office Action Dated Apr. 10, 2025 for Corresponding European Patent Application No. 24214864.1.

* cited by examiner

B - B

SEX TOY

CROSS-REFERENCE TO RELATED APPLICATIONS

This application is a continuation in part application of U.S. patent application Ser. No. 18/516,984, filed on Nov. 22, 2023. The content of which are incorporated herein by reference.

TECHNICAL FIELD

The present application relates to the technical field of adult products, and in particular to a sex toy.

BACKGROUND

In recent years, adult sex products are developed to help the users to release their sex pressure. Generally, an existing sex toy uses a vibration motor to provide vibration to the user's sensitive areas, such as the female genitalia, the male genitalia and the like, which has monotonous stimulation effects and is therefore unable to satisfy users' needs.

SUMMARY

An object of the present application is to provide a sex toy with better stimulation effect to improve the users' sexual experience.

In order to achieve the above object, a technical solution of the present application provides a sex toy, having a stimulation chamber extending along a longitudinal direction for accommodating a male penis, the sex toy including:

at least two massage arms, the at least two massage arms including a first massage arm and a second massage arm respectively arranged on opposite sides of the stimulation chamber; and a drive assembly, in torque-transmission connection with the at least two massage arms, for driving the first massage arm and the second massage arm to slide towards or away from each other, thereby changing a radial dimension of the stimulation chamber at a portion corresponding to the first massage arm and the second massage arm.

In some embodiments, the drive assembly includes a drive mechanism having a rotation output shaft, and a push member, the rotation output shaft drives the push member to move along the longitudinal direction when rotating, and each of the first massage arm and the second massage arm includes at least one slider slidably engaged with the push member such that the push member drives the sliders to slide in the radial direction when the push member moves in the longitudinal direction.

In some embodiments, the push member is slidably engaged with each slider via a slot and a protrusion, the slot is defined in one of the push member and a corresponding slider, and the protrusion is formed on an other of the push member and the corresponding slider, the protrusion is slidably engaged in the slot.

In some embodiments, each slider is provided with the protrusion, and the push member is provided with a first slot and a second slot respectively corresponding to the protrusions of the sliders of the first massaging arm and the second massaging arm, the first slot and the second slot are both inclined relative to the longitudinal direction, and the first slot and the second slot extend gradually close to each other or gradually away from each other along the longitudinal direction.

In some embodiments, the first slot and the second slot are arranged in a V shape or a truncated V shape.

In some embodiments, the sex toy further including a guide member fixedly disposed for guiding sliding direction of the sliders of the first massage arm and the second massage arm, wherein the guide member has a guide slot for receiving the sliders, the guide slot extends substantially in the radial direction.

In some embodiments, the push member is threadedly engaged with the rotation output shaft, the drive mechanism includes a motor and a gear assembly, an input end of the gear assembly is in torque transmission connection with a rotating shaft of the motor, the rotation output shaft is configured as an output end of the gear assembly.

In some embodiments, the sex toy is constructed as a claw-like structure.

In some embodiments, the sex toy further includes a housing, the at least two massage arms are disposed on two sides of the housing respectively, one end of each the massage arm is slidably connected to the housing, and distal ends of the first massage arm and the second massage arm extended towards each other, and wherein the at least two massage arms and the housing enclose the stimulation chamber.

In some embodiments, the distal ends of the first massage arm and the second massage arm are spaced apart from each other.

In some embodiments, the distal ends of the first massage arm and the second massage arm are connected by a flexible member.

In some embodiments, the sex toy further including at least one vibration member, wherein one of the at least one vibration members is disposed within one of the at least two massage arms.

In some embodiments, the massage arms include soft materials, the soft materials being disposed on at least one side facing toward the stimulation chamber.

In some embodiments, the soft materials of the massage arms are flexible sleeves disposed at an periphery of the massage arms.

In some embodiments, the sex toy includes a flexible cover, the flexible cover being a one-piece component, the at least two massage arms are partially disposed within the flexible cover.

In some embodiments, the sex toy includes an outer tube and an inner tube disposed inside the outer tube, the inner tube includes a soft material disposed facing toward the stimulation chamber, an accommodating chamber is formed between the outer tube and the inner tube, the at least two massage arms are disposed in the accommodating chamber, and the first massage arm and the second massage arm are disposed on opposite radial sides of the inner tube respectively.

In some embodiments, two longitudinal ends of the inner tube are both open.

In some embodiments, one longitudinal end of the inner tube is open, and an other longitudinal end of the inner tube is closed.

In some embodiments, the inner tube is a one-piece component and entirely made of soft material.

In some embodiments, the at least two massage arms include another first massage arms arranged at one side of the stimulation chamber adjacent to the first massage arm, and another second massage arm arranged at an other side of the stimulation chamber adjacent to the second massage arm, the two first massage arms are connected to a first common slider, the two second massage arms are connected to a second common slider, and wherein the drive assembly includes a drive mechanism having a rotation output shaft, and a push member threadedly engaged with the rotation output shaft, the rotation output shaft drives the push member to move along the longitudinal direction when rotating, and the push member is provided with a first slot and a second slot engageable with the first common slider and the second common slider, respectively.

Compared with the prior art, the sex toy provided by the embodiments of the present application allows the first massage arm and the second massage arm to slide towards or away from each other by the drive assembly, thereby changing the size of the radial dimension of the stimulation chamber located at the first massage arm and the second massage arm and massage the male penis placed in the stimulation chamber.

BRIEF DESCRIPTION OF THE DRAWINGS

In order to illustrate the technical solution in embodiments of the present application more clearly, the following briefly introduces accompanying drawings used in the description of the embodiments. Apparently, the accompanying drawings in the following description are only some embodiments of the present application. Those of ordinary skill in the art can obtain other accompanying drawings from these accompanying drawings without any creative efforts.

LIST OF REFERENCE SIGNS

Figure 1:
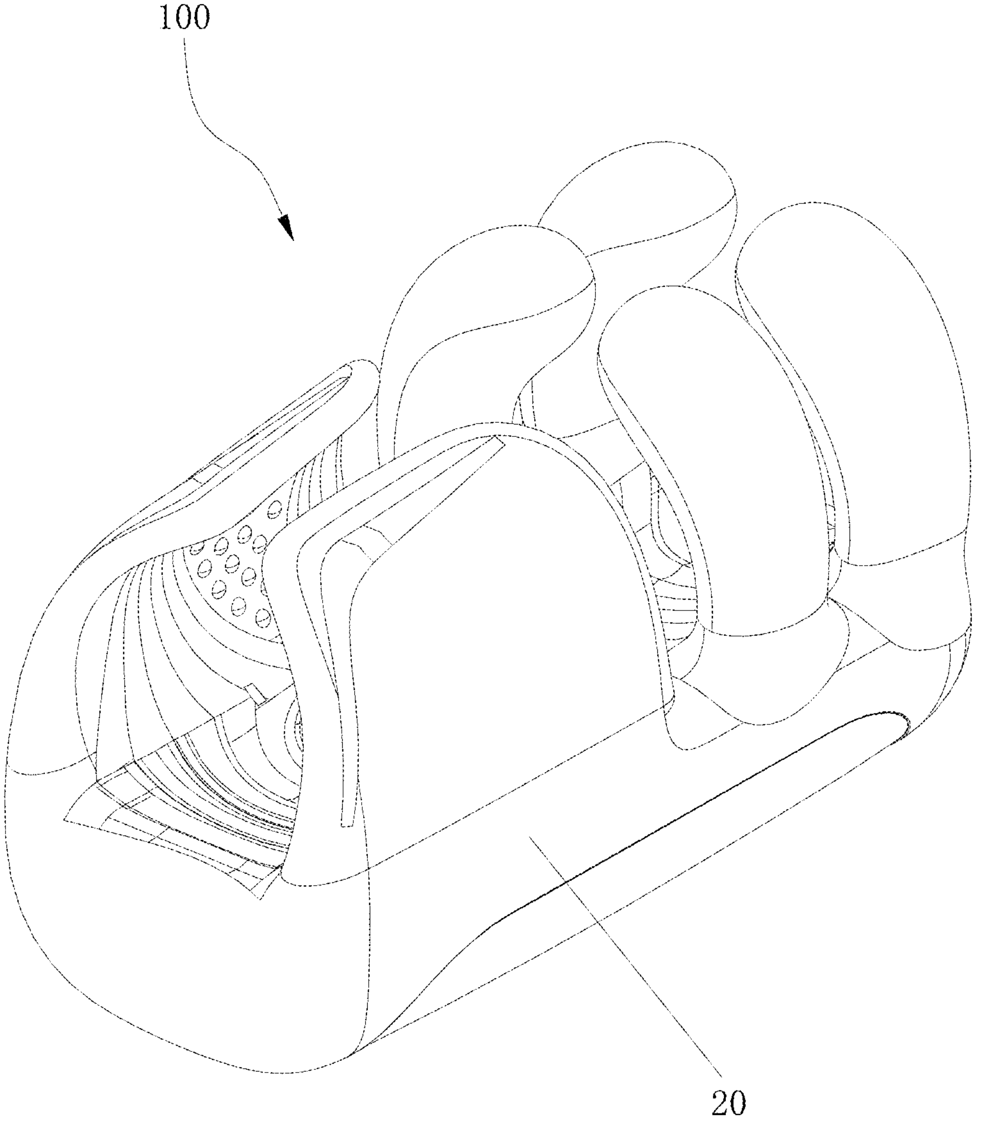
FIG. 1 is an isometric, assembled view of a sex toy according to a first embodiment of the present application.

Sex toy 100; shell 20; outer shell 22; inner shell 24; first stimulation module 40; first motor 42; swinging unit 44; transmission unit 46; first swinging bar 441; second swinging bar 443; second stimulation module 50; third stimulation module 60; output shaft 621; third motor 62; eccentric wheel 64; rod 641; swinging rod 66; head 661; stimulation chamber 100*a*; first massage arm 11; second massage arm 12; support member 11*a*, 12*a*; first beam 11*c*; second beam 12*c*; slider 13; protrusion 131; flexible sleeve 11*b*, 12*b*; drive assembly 2; drive mechanism 21; push member 220; first slide slot 221*a*; second slide slot 221*b*; guide member 3; guide slot 3*a*; fourth motor 211; rotating shaft 211*a*; gear assembly 212; rotation output shaft 2121; housing 4; mounting cavity 4*a*; top case 4*b*; bottom case 4*c*; vibration member 5; flexible cover 6; outer tube 7; inner tube 8; accommodating chamber 100*b*; transmission mechanism 23; screw rod 231; spiral groove 231*a*; pin 232; stationary sleeve 233; battery 91; control board 92; flexible member 93.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential", "vertical" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Figure 2:
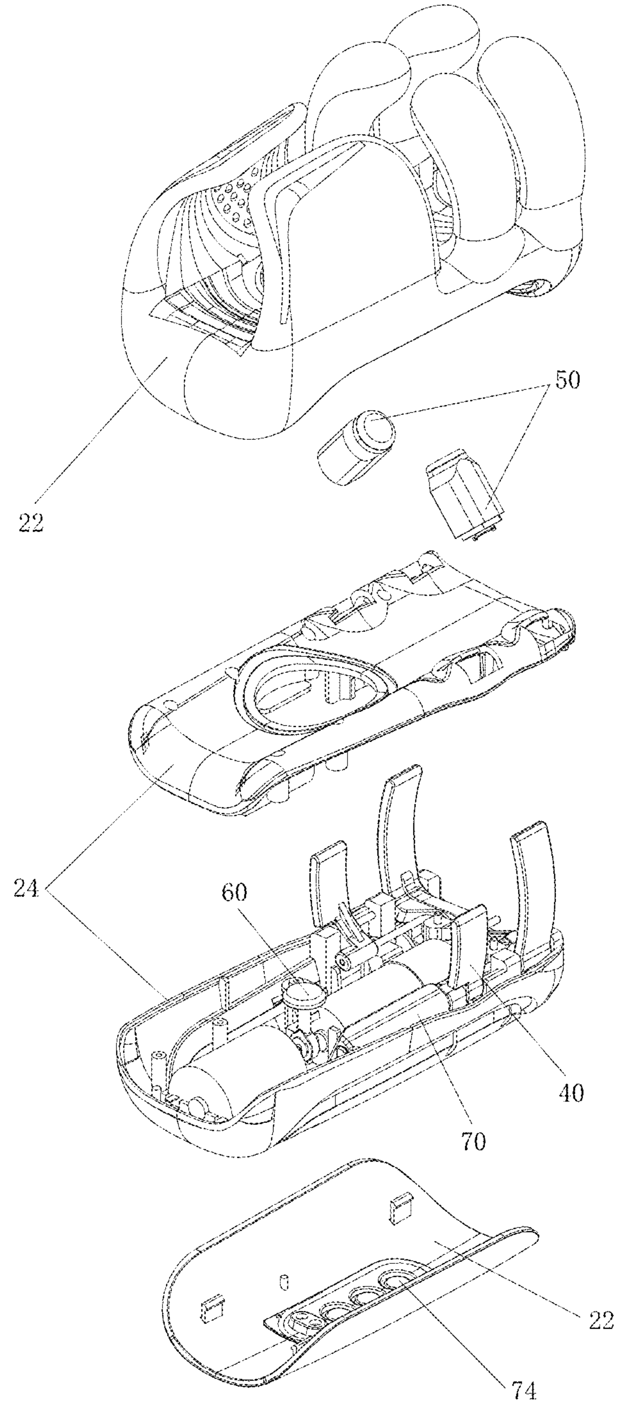
FIG. 2 is an isometric, exploded view of the sex toy of FIG. 1.

Referring to FIG. 1 to FIG. 2, a sex toy 100 according an embodiment of the present application is shown. The sex toy 100 includes a shell 20 and one or more stimulation modules mounted in the shell 20.

As shown in FIG. 1, the shell 20 in whole is substantially configured as a human hand, which includes a palm and several fingers extending from the palm. Preferably, the shell 20 is a double-layer structure, and includes an outer shell 22 and an inner shell 24 inside the outer shell 22. The inner shell 24 may be made of hard materials, such as plastic, metal and etc., providing support to the stimulation modules mounted inside the shell 20; and the outer shell 22 may be made of soft materials, such as silicone, rubber and etc., for directly contacting the male penis, as such the sex toy 100 has high strength and comfortable use experience.

Referring to FIG. 2, in the present embodiment, the stimulation modules include a first stimulation module 40, a second stimulation module 50 and a third stimulation module 60.

The first, second and third stimulation modules 40, 50, 60 provide stimulation to the male penis in different manners and thus can achieve better stimulation effects.

Figure 3:
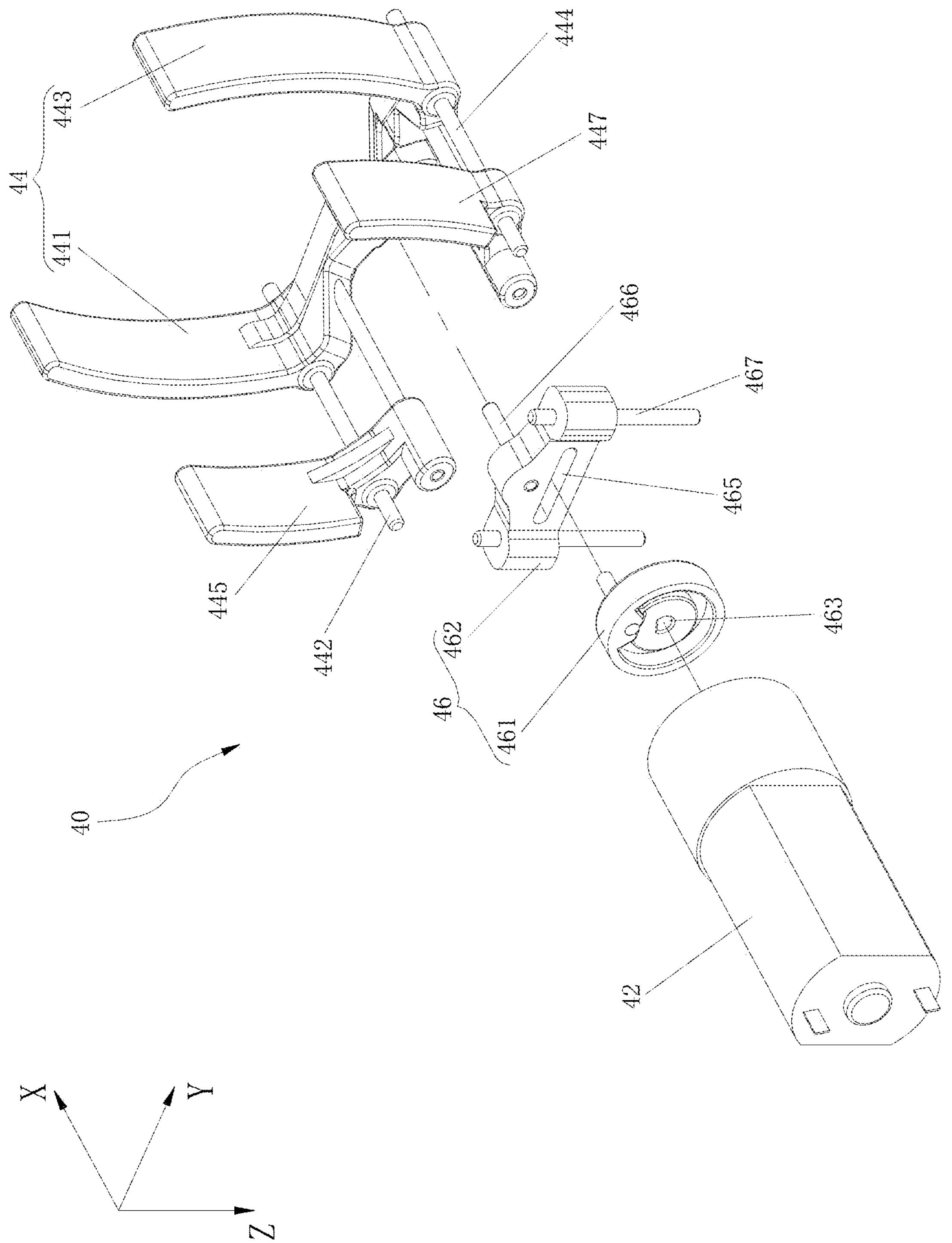
FIG. 3 is a further exploded view of a first stimulation module of the sex toy of FIG. 1.

As shown in FIG. 3, the first stimulation module 40 includes a first motor 42, a swinging unit 44 and a transmission unit 46 connected between the first motor 42 and the swinging unit 44. The swinging unit 44 includes a first swinging bar 441 and a second swinging bar 443 which are substantially arranged symmetric to each other. During operation of the first motor 42, the first swinging bar 441 and second swinging bar 443 are driven to swing relative to the shell 20, close to or away from each other, thereby achieving an occlusion action to occlude a sensitive part of the human body put between the first swinging bar 441 and second swinging bar 443.

As shown in FIG. 2, the second stimulation module 50 includes at least one second motor, which may be vibration motor for generating high-frequency vibration to the sensitive part of the human body put between the fingers. The second stimulation module 50 is set in the fingers of the shell 20, and is located adjacent to fingertips. Preferably, the second stimulation module 50 includes several second motors, and each second motor is set in one of the fingers. The second motors may be set in some of the fingers, or may be set in each of the fingers. During use, the first stimulation module 40 may operate independently, the second stimulation module 50 may operate independently, and the first and second stimulation modules 40, 50 may operate simultaneously.

Figure 4:
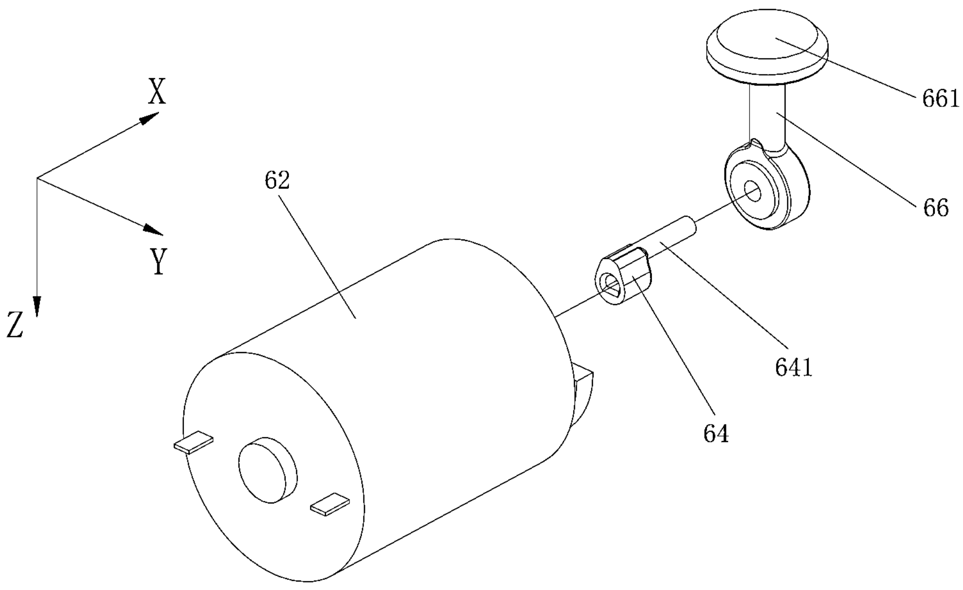
FIG. 4 is a further exploded view of a third stimulation module of the sex toy of FIG. 1.
Figure 5:
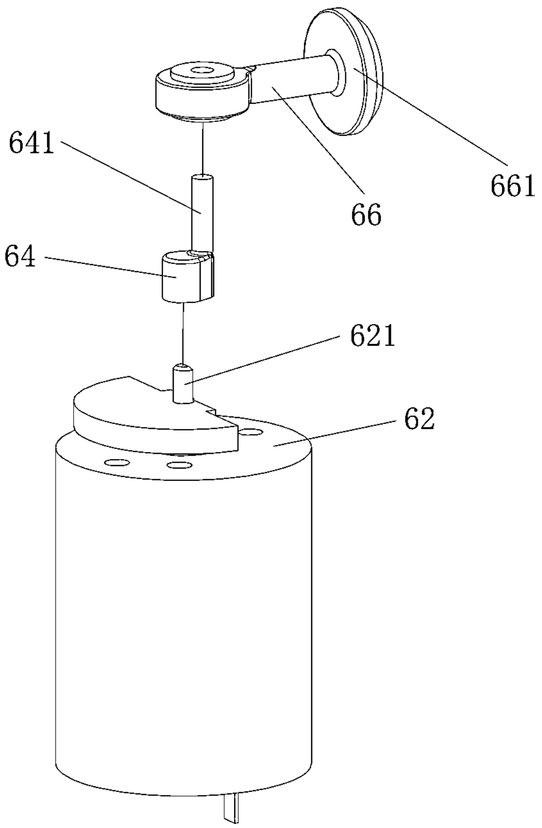
FIG. 5 shows the third stimulation module of FIG. 4 from another aspect.

As shown in FIG. 4 and FIG. 5, the third stimulation module 60 includes a third motor 62 with an output shaft 621, a eccentric wheel 64 connected to the output shaft 621 of the third motor 62, and a swinging rod 66 connected to the eccentric wheel 64. The eccentric wheel 64 has a rod 641 extending out therefrom, and the rod 641 is parallel to the output shaft 621 of the third motor 62. The swinging rod 66 is generally perpendicular to the rod 641, with one end thereof being rotatably mounted around the rod 641 and another end thereof embedded into the shell 20, specifically a portion of the outer shell 22 at the palm. Preferably, a head 661 with a diameter larger than other portions of the swinging rod 66 is formed at the another end of the swinging rod 66, improving a stability of the connection between the swinging rod 66 and the outer shell 22.

Referring also to FIG. 4 and FIG. 5, the output shaft 621 of the third motor 62 and the rod 641 of the eccentric wheel 64 both extend along the X-direction, and the swinging rod 66 extends along the Z-direction. During operation, rotation of the third motor 62 is converted into revolving of the swinging rod 66 about the output shaft 621, and then converted into reciprocating movement in the Z-direction of the swinging rod 66 and a portion of the outer shell 22 corresponding to the head 661 of the swinging rod 66 since the swinging rod 66 is limited to move in the X-direction and Y-direction for the engagement with the shell 20. At the same time, a relative rotation is generated between the swinging rod 66 and the rod 641. That is, the third stimulation module 60 provides reciprocating motion in the Z-direction to drum a part of the human body nestled to the head 661.

In other words, a pinching function that simulates a human hand holding and kneading the male genitalia is achieved by the first stimulation module 40 of the first embodiment of the present application in the form of swinging. Furthermore, the present application also provides an alternative embodiment that also achieves pinching function by sliding movement.

Referring to FIGS. 6 to 11, a sex toy 100 provided in a second embodiment of the present application is shown, the sex toy 100 has a stimulation chamber **100*a* extending along a longitudinal direction. The sex toy 100 includes at least two massage arms 11, 12 and a drive assembly 2. Specifically, the stimulation chamber 100*a* is used to receive a male penis. The number of massage arms 11, 12 is at least two. That means, the number of massage arms 11, 12 may be two, three, four, or more, and more massage arms 11, 12 have a larger contact area for the penis located in the stimulation chamber 100*a***, which can provide a sufficient stimulation and massage effect, and improve the user experience of the product.

The at least two massage arms 11, 12 including a first massage arm 11 and a second massage arm 12 respectively disposed on opposite sides of the stimulation chamber **100*a*, and the drive assembly 2 is in torque-transmission connection with the at least two massage arms 11, 12 for driving the first massage arm 11 and the second massage arm 12 to slide towards or away from each other, thereby changing a radial dimension of the stimulation chamber 100*a* at a portion corresponding to the first massage arm 11 and the second massage arm 12**.

It should be noted that, in the context, the longitudinal direction refers to the extension direction of the stimulation chamber **100*a*, i.e., the insertion direction of the male penis, and a radial direction refers to the direction perpendicular to the extension direction of the stimulation chamber 100*a***.

The sex toy 100 provided by the embodiments of the present application allows the first massage arm 11 and the second massage arm 12 to move close to each other or move away from each other by the drive assembly 2, thereby changing the size of the radial dimension of the stimulation chamber **100*a* at a portion corresponding to the first massage arm 11 and the second massage arm 12**.

On the one hand, the structure of the sex toy 100 provides more personalised and comfortable stimulating massage experience with a simple and compact structure.

On the other hand, the massage arms 11, 12 can provide a more comprehensive stimulating massage effect on the male penis located in the stimulation chamber **100*a***, further improving the using experience of the product.

Figure 8:
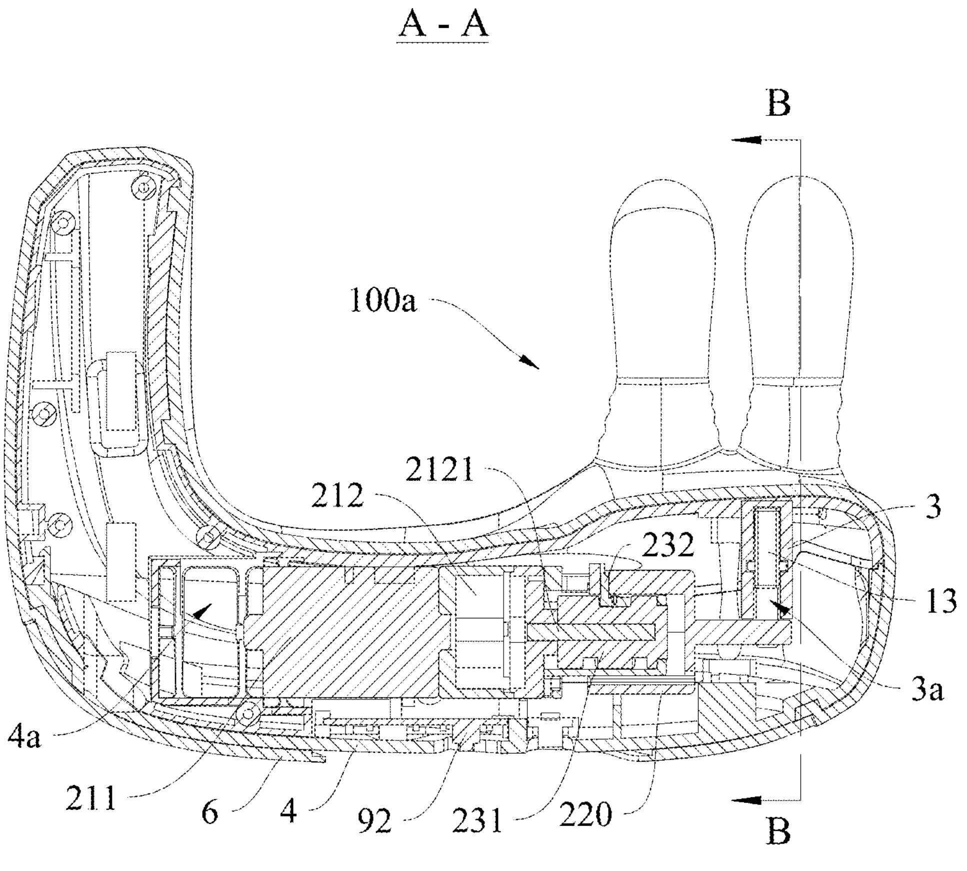
FIG. 8 is a sectional view of the structure of the sex toy of FIG. 7, taken along line A-A.
Figure 10:
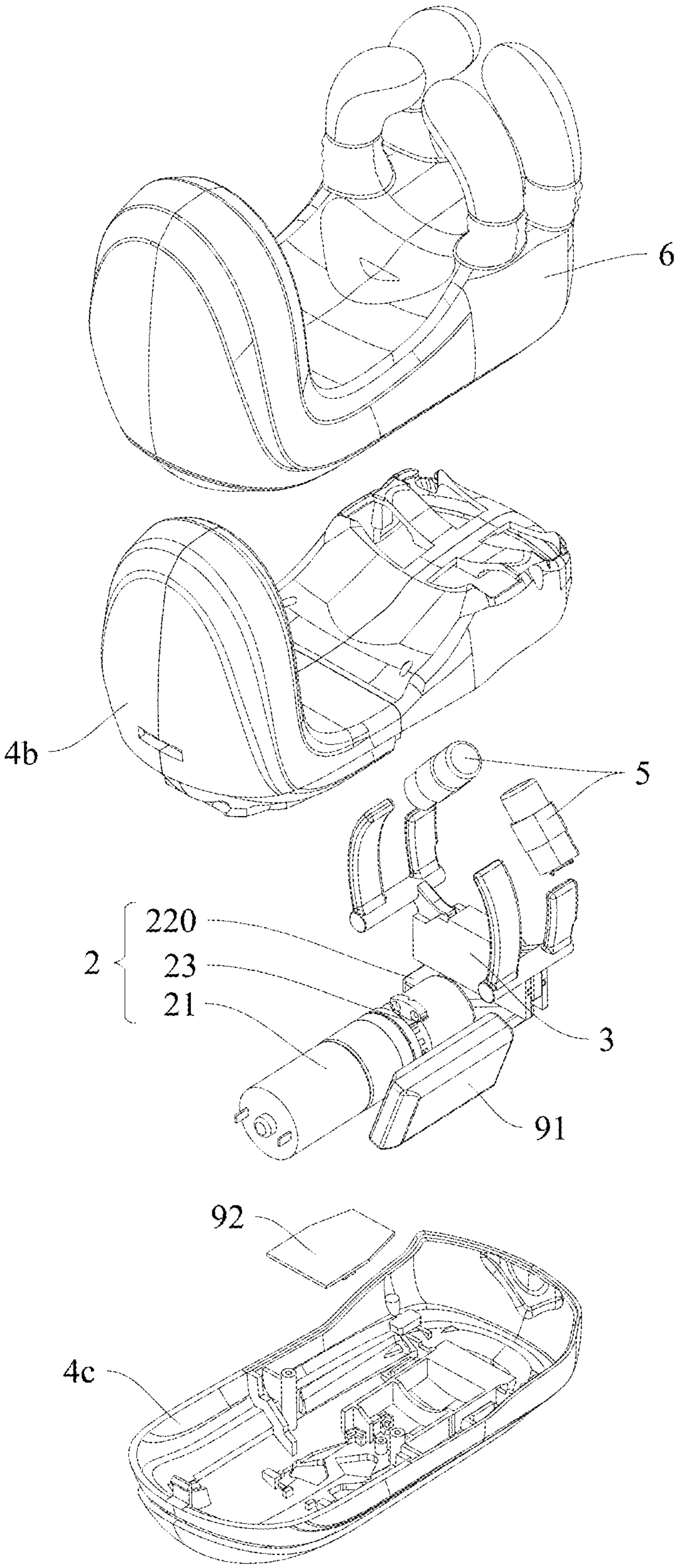
FIG. 10 is an exploded view of the sex toy of FIG. 6.
Figure 11:
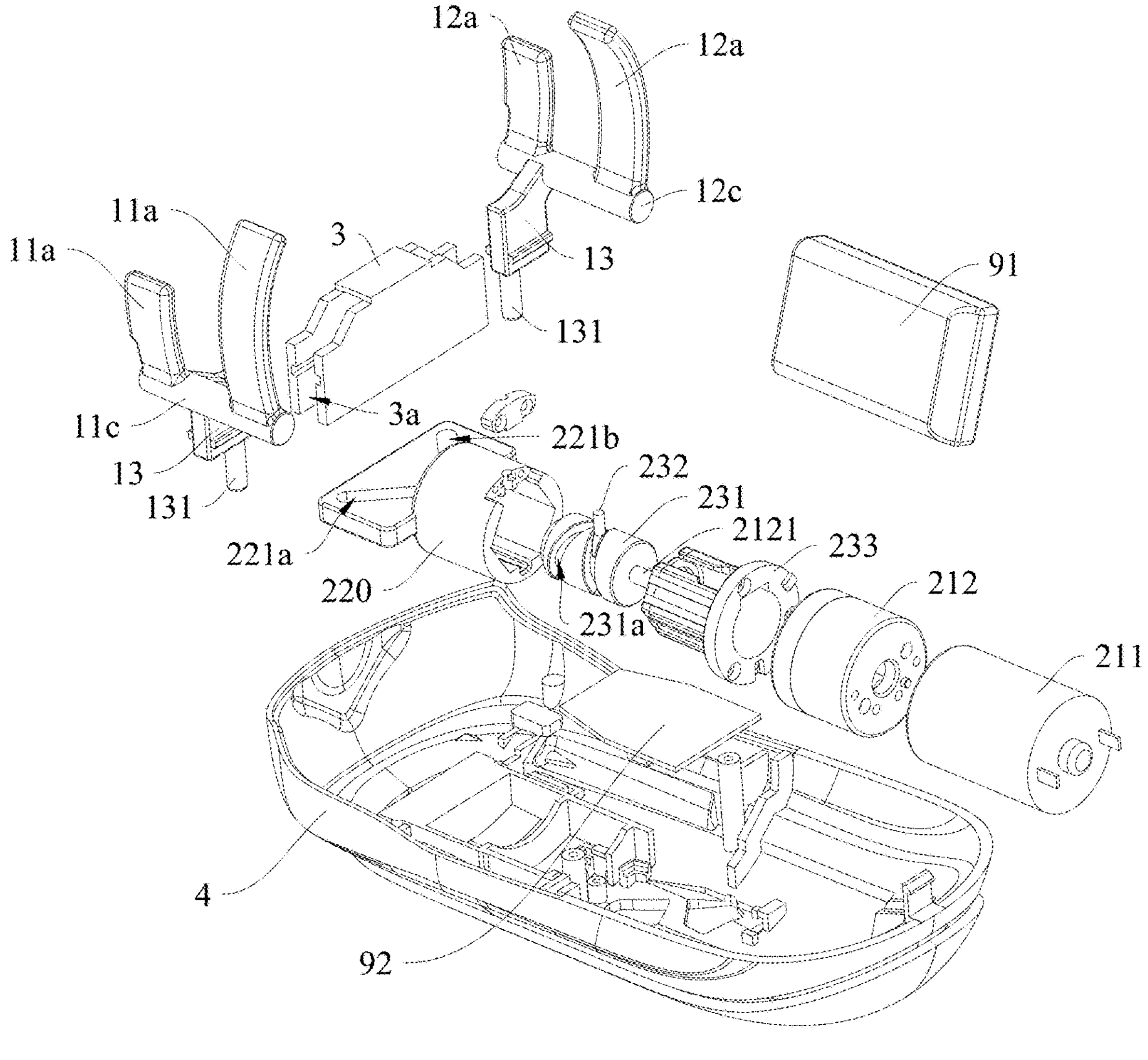
FIG. 11 is a further exploded view of the sex toy of FIG. 10, wherein main structures of a drive assembly and a massage arm are shown schematically.
Figure 12:
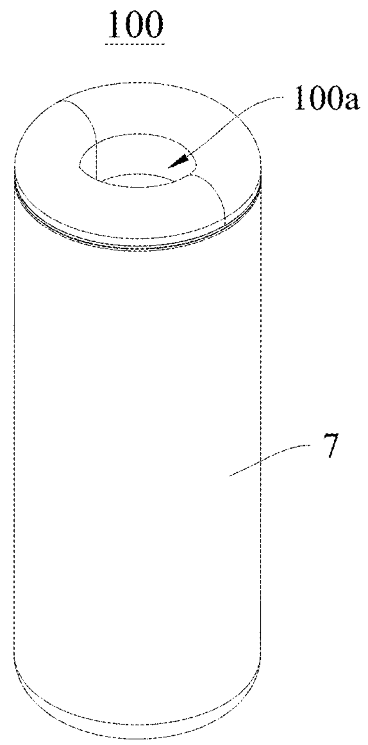
FIG. 12 is an isometric, assembled view of a sex toy of a third embodiment of the present application.
Figure 13:
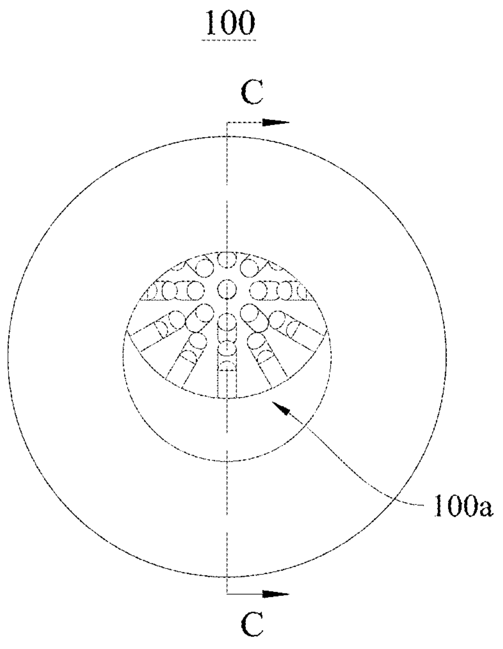
FIG. 13 is a schematic view of FIG. 12, viewed from another aspect.

Referring to FIG. 8, FIG. 10, and FIG. 11, the drive assembly 2 includes a drive mechanism 21 having a rotation output shaft 2121, and a push member 220 threadedly engaged with the rotation output shaft 2121. The rotation output shaft 2121 drives the push member 220 to move along the longitudinal direction when rotating. Each of the first massage arm 11 and the second massage arm 12 includes at least one slider 13 slidably engaged with the push member 220 such that the push member 220 drives the slider

13 to slide in the radial direction when the push member 220 moves in the longitudinal direction.

That is to say, the drive assembly 2 can transform rotational rotation into linear movement, and the rotation of the rotation output shaft 2121 of the drive assembly 2 can drive the push member 220 to slide along the longitudinal direction of stimulation chamber 100*a*. Through the slidable engagement between the push member 220 and the sliders 13 of the massage arms 11, 12, the sliders 13 are driven to slide along the radial direction perpendicular to the longitudinal direction, thereby driving the first massage arm 11 and the second massage arm 12 to slide along the radial direction, towards or away from each other.

The present disclosure does not limit the way to convert the rotation into linear motion. As an example, the drive assembly 2 may be driven by a screw-rod mechanism, which converts the rotation movement of the screw-rod into linear movement of the push member 220 along the axial direction of the screw-rod by threaded connection between the threads on the screw-rod and the push member 220.

In particular, in one embodiment, referring to FIGS. 8, 10 and 11, the drive assembly 2 includes a transmission mechanism 23, and the transmission mechanism 23 includes a screw rod 231 extending along the longitudinal direction and a pin 232. The screw rod 231 is connected to the rotation output shaft 2121 and synchronously rotates with the rotation output shaft 2121 synchronization. The outer periphery of the screw rod 231 has a spiral groove 231*a*. One end of the pin 232 is slidingly engaged inside the spiral groove 231*a*, and the other end of the pin 232 is fixed to the push member 220. The push member 220 together with the pin 232 is allowed to slide but prevented from rotation. Thus, the rotation of the screw rod 231 drives the pin 232 in the spiral groove 231*a* to slide linearly along the longitudinal direction, thereby driving the push member 220 fixed with the pin 232 to slide linearly along the longitudinal direction. Specifically, in one embodiment, the transmission mechanism 23 further includes a stationary sleeve 233. The longitudinal end of the push member 220 away from the massage arms 11, 12 is slidably nested with the stationary sleeve 233. The stationary sleeve 233 is used to prevent the push member 220 from rotating with the screw rod 231. For example, the sleeve 233 may have a hole into which the longitudinal end of the push member 220 slidably inserts. Preferably, the hole and the longitudinal end are form-fitting such that relative rotation between the push member and the sleeve is prevented. The hole may have a polygon shape such as quadrilateral, pentagonal, or hexagonal shape.

Alternatively, it is possible to use a cam mechanism to achieve torque transmission, in which the push member 220 may be configured as a driven part that is driven by a cam. The push member 220 is driven to perform a linear movement through the rotation movement of the cam. The specific shape of the cam can be adapted to control the movement track of the push member 220.

Alternatively, it is also possible to use a gear rack mechanism to achieve torque transmission, in which the rotation of the gear can drive a meshed rack to move linearly. In particular, the rotation of the gear may be converted into the linear motion of the rack through the meshing of gear teeth and the rack. In that case, it only requires a fixed connection between the rack and the push member 220, the linear motion of the push member 220 can be achieved. Furthermore, known crank slider mechanism and other transmission mechanisms may also be used, which will not be described in detail here.

In the present disclosure, the slider 13 is slidingly engaged with the push member 220, but the manner how to drive the slider 13 to slide in the radial direction when the push member 220 is sliding along the longitudinal direction is not particularly limited. Exemplarily, in one embodiment, the push member 220 is provided with a wedge, and the slider 13 has a sloping surface engageable with the wedge. When the push member 220 slides along the longitudinal direction, the wedge urges the slider 13 to push the slider 13 to slide along the radial direction through the engagement with the sloping surface.

In some embodiments, the slidable engagement between the push member 220 and the slider 13 is achieved via a slot 221*a* or 221*b* and a protrusion 131. The slot 221*a*, 221*b* is formed on one of the push member 220 and the slider 13, and the protrusion 131 is formed on the other of the push member 220 and the slider 13, The protrusion 131 is slidingly inserted within the slot 221*a*, 221*b*. The positions of the slot 221*a*, 221*b* and the protrusion 131 are not limited. That is, in case that the push member 220 is provided with the slot 221*a*, 221*b*, the slider 13 is provided with the corresponding protrusion 131; in case that the push member 220 is provided with the protrusion 131, the slider 13 is provided with the corresponding slot 221*a*, 221*b*. In other words, the push member 220 and the slider 13 are slidably connected by the slot 221*a*, 221*b* and the protrusion 131. When the push member 220 moves, the protrusion 131 sliding in the slot 221*a*, 221*b*, and drives the slider 13 to move.

Figure 16:
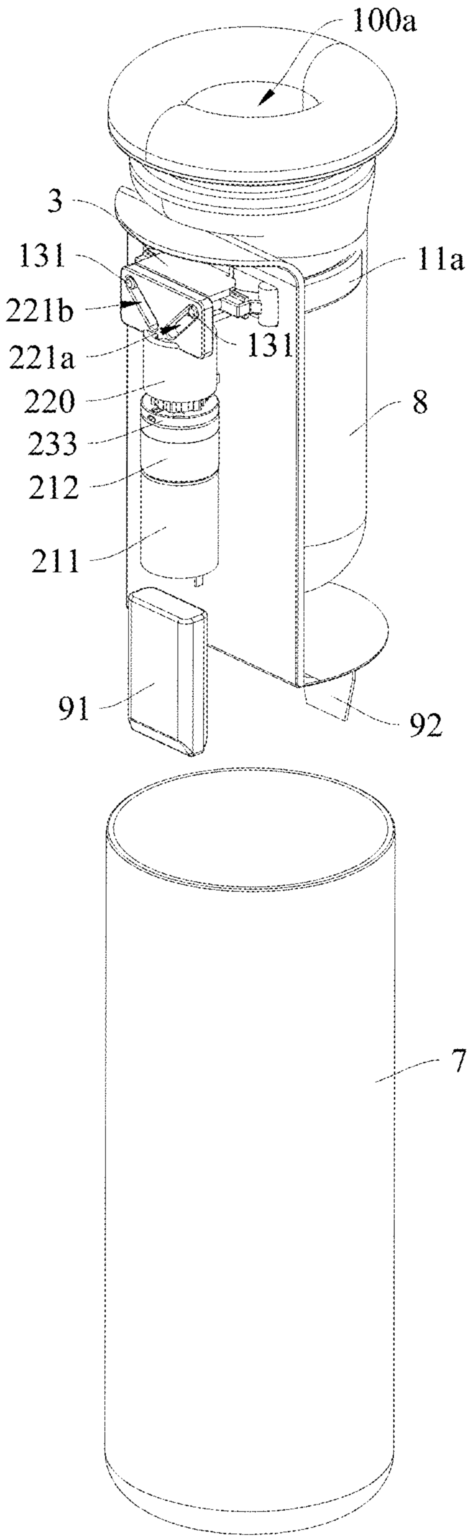
FIG. 16 is an exploded view of the sex toy of FIG. 12.

In some embodiments, referring to FIGS. 10, 11, and 16, the protrusion 131 is provided on the slider 13, and the push member 220 is provided with a first slot 221*a* and a second slot 221*b* respectively corresponding to sliders 13 of the first massaging arm 11 and the second massaging arm 12. The first slot 221*a* and the second slot 221*b* are both inclined relative to the longitudinal direction.

Specifically, a portion of the push member 220 adjacent to the first massage arm 11 and the second massage arm 12 is substantially a plate-like structure, and the first slot 221*a* and the second slot 221*b* are both formed in the plate-like structure. The first slot 221*a* and the second slot 221*b* are both elongated. The protrusions 131 on the sliders 13 of the first massage arm 11 and the second massage arm 12 are both configured as posts extending along vertical direction. The posts are inserted in the first slot 221*a* and the second slot 221*b*, respectively. Since both the first slot 221*a* and the second slot 221*b* are inclined relative to the longitudinal direction, the sliders 13 of the first massage arm 11 and the second massage arm 12 are guided through the first slot 221*a* and the second slot 221*b* as the push member 220 slides along the longitudinal direction, causing sliding of the sliders 13 within the slots 221*a*, 221*b* in the radial direction, thereby achieving radially sliding of the first massage arm 11 and the second massage arm 12.

In some embodiments, the first slot 221*a* and the second slot 221*b* extend gradually close to each other or gradually away from each other along the longitudinal direction. That is, the radial spacing between the first slot 221*a* to the second slot 221*b* gradually decreases or increases.

For example, the extension direction of the first slot 221*a* may be parallel to the longitudinal direction, and the extension direction of the second slot 221*b* is inclined at an angle relative to the extension direction of the first slot 221*a*. Alternatively, the extension direction of the second slot 221*b* may be parallel to the longitudinal direction, while the extension direction of the first slot 221*a* is inclined at an angle relative to the extension direction of the second slot 221*b*.

Further, in some embodiments, referring to FIGS. 10, 11, and 16, neither the extension direction of the first slot 221*a* nor the extension direction of the second slot 221*b* is parallel to the longitudinal direction, the first slot 221*a* and the second slot 221*b* are arranged in V-shape or truncated V-shape. Accordingly, there is an angle between the extension direction of the first slot 221*a* and the extension direction of the second slot 221*b*. The range of the angle is not particularly limited, but may be set greater than 0 degree and less than 180 degrees as required. For example, the angle may be 30 degrees, 60 degrees, 90 degrees, 120 degrees, 150 degrees, and so on. in the case of V-shape arrangement one axial end of the first slot 221*a* and one axial end of the second slot 221*b* intersect; and the other end of the first slot 221*a* and the other end of the second slot 221*b* are spaced from each other.

Figure 7:
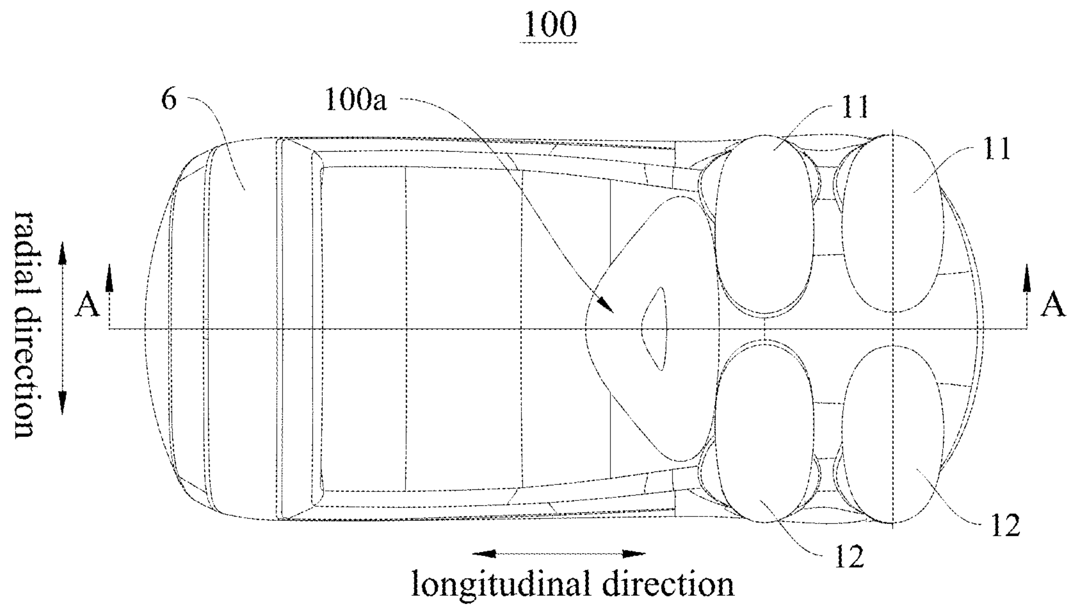
FIG. 7 is a schematic top view of the sex toy of FIG. 6.

In some embodiments, referring to FIG. 7 and FIG. 8, the drive mechanism 21 includes a fourth motor 211 and a gear assembly 212. An input end of the gear assembly 212 is in torque transmission connection with a rotating shaft 211*a* of the fourth motor 211. The rotation output shaft 2121 is configured as an output end of the gear assembly 212. The gear assembly 212 is able to adjust the output speed of the rotation output shaft 2121 and increase the output torque, which is able to improve the control precision of the sex toy 100 and slow down the work load of the fourth motor 211, thereby achieving more stable stimulation to the male penis, ensuring the reliability of the sex toy and the users' product experience.

In some embodiments, referring to FIGS. 6 to 11, the sex toy 100 is entirely constructed as a claw-like structure. The sex toy 100 further includes a housing 4. The at least two massage arms 11, 12 are disposed on two sides of the housing 4, respectively. One end of each of the massage arms 11, 12 is slidingly connected to the housing 4, and distal ends of the first massage arm 11 and the second massage arm 12 extend out of the housing 4 and extended towards each other. Preferably, the distal ends of the first massage arm 11 and the second massage arm 12 are curved towards each other. The at least two massage arms 11, 12 and the housing 4 enclose the stimulation chamber 100*a*. Specifically, the housing 4 includes a top case 4*b* and a bottom case 4*c* connected together, for example, by snapping-fit. The housing 4 defines a mounting cavity 4*a* therein, and the drive assembly 2 is disposed in the mounting cavity 4*a* of the housing 4.

In some embodiments, referring to FIG. 10, FIG. 11 and FIG. 16, the sex toy 100 further includes a guide member 3, the guide member 3 is fixedly disposed for guiding sliding direction of the slider 13. The guide member 3 has a guide slot 3*a* corresponding to the slider 13 for receiving the same. The guide slot 3*a* extends substantially in the radial direction. Specifically, the guide member 3 has a groove structure. The guide member 3 can be fixed on the housing 4 to ensure that the guide member 3 is fixed relative to the housing 4. The housing 4 include, but are not limited to, hard plastics such as polypropylene (PP), polyvinyl chloride (PVC), polycarbonate (PC), etc. Thus, it provides structural support for the components received therein.

The guide slot 3*a* extending substantially in the radial direction means that the extension direction of the guide slot 3*a* and the radial direction may be the same or have a slight angle. The range of the angle is not particularly limited, but may be set between greater than or equal to 0 degrees and less than or equal to 20 degrees as required, for example, the angle is 0 degrees, 10 degrees, 20 degrees, and so on. Exemplarily, in an embodiment, one end of the guide member 3 away from the massage arm 1 is open to form a guide slot 3*a* extending in a radial direction, and the slider 13 is slidably inserted in the guide slot 3*a* and thus is slidable along the radial direction. The guide member 3 increases the stability of the sliders 13 when sliding in the radial direction.

Figure 6:
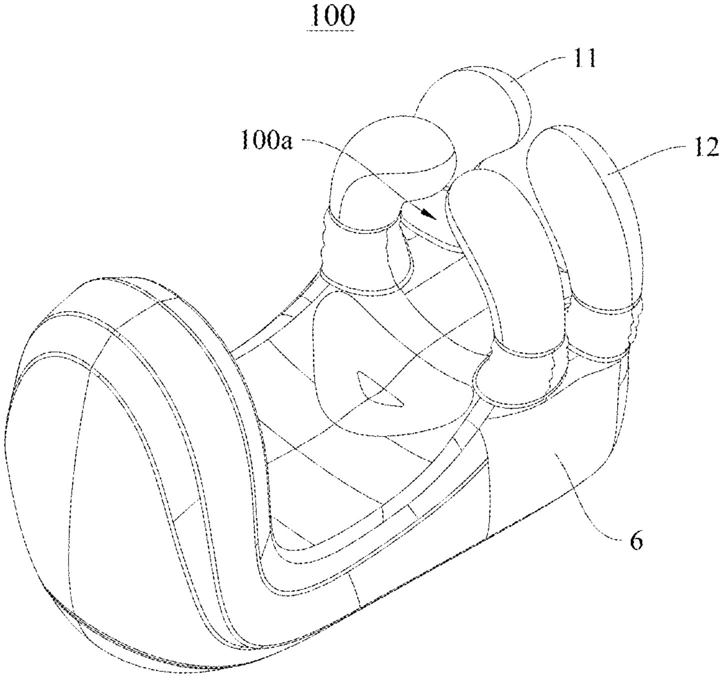
FIG. 6 is a schematic view of the structure of a sex toy of a second embodiment of the present application.
Figure 6A:
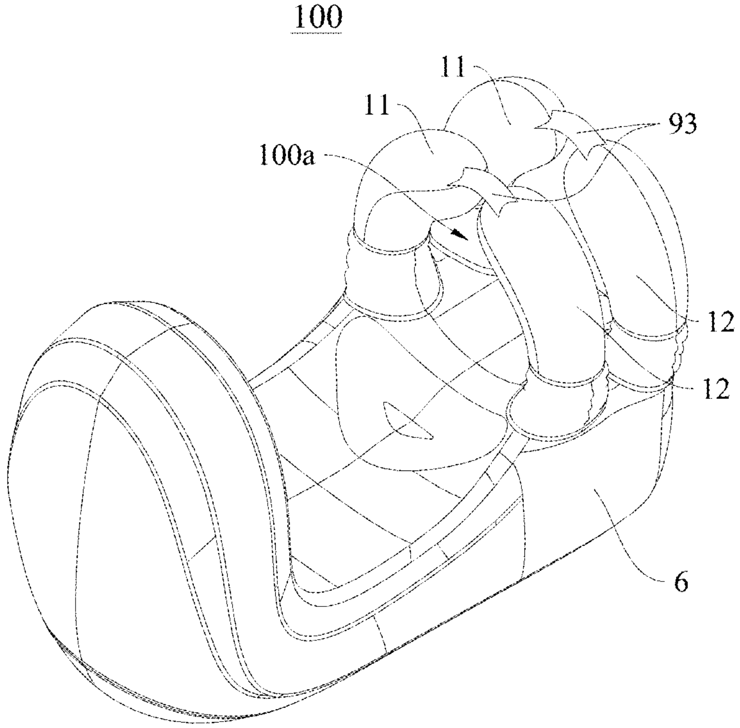
FIG. 6*a* is a schematic view of an alternative structure of the sex toy of FIG. 6, wherein a flexible sleeve and a flexible member are shown schematically.

In some embodiments, referring to FIG. 6*a*, the distal ends of the first massage arm 11 and the second massage arm 12 may be connected together by a flexible member 93. The flexible member 93 includes but is not limited to a stretchable and soft silicone or the like. The flexible member 93 can further improve the wrapping effect of the stimulation chamber 100*a* of the sex toy 100, and thus improves user experience.

Figure 9:
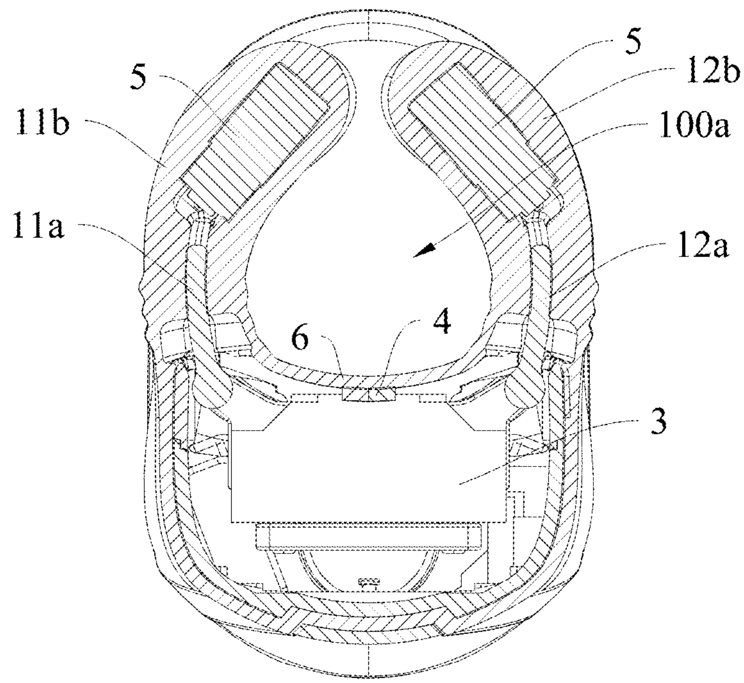
FIG. 9 is a sectional view of the structure of the sex toy of FIG. 8, taken along line B-B.

In some embodiments, referring to FIGS. 9 to 11, the sex toy 100 further includes at least one vibration member 5, one of which is arranged within one of the at least two massage arms 11, 12. That is, the number of vibration members 5 may be one, two or more. Each of massage arms 11, 12 may be equipped with a vibration member 5, or may be only one vibration member 5 is provided which is disposed in one of the massage arms 11, 12. Alternatively, it is also possible to provide a plurality of vibration members 5 that are disposed in one of the massage arms 11, 12. The number and position of the vibration member is not specifically limited herein. The vibration member 5 may be a vibration motor, including but not limited to an eccentric vibration motor, a linear vibration motor, an electromagnetic vibration motor, and the like.

In some embodiments, the massage arms 11, 12 include soft materials disposed at least on one side facing the stimulation chamber 100*a*. Wherein the soft materials include, but are not limited to, silicone that is non-toxic and antibacterial and has good chemical stability. Due to the soft materials having soft and skin-friendly properties, the massage arms 11, 12 contacts the male penis in the stimulation chamber 100*a* through the soft materials, this reduce friction and improve the product's comfort.

In some embodiments, the first massage arm 11, includes a support member 11*a* connected to or forming the slider, and a flexible sleeve 11*b* mounted around or wrapped around the support member 11*a*. The second massage arm 12 includes a support member 12*a* connected to or forming the slider, and a flexible sleeve 12*b* mounted around or wrapped around the support member 12*a*. That is, the soft materials of the massage arms 11, 12 are configured as the flexible sleeves 11*b*, 12*b* disposed at the outer periphery. The flexible sleeves 11*b*, 12*b* can ensure that all areas of the massage arms 11, 12 are soft and skin-friendly, further improving the using experience of the product.

In this embodiment, the at least two massage arms 11, 12 include two first massage arms 11 arranged at one side of the stimulation chamber 100*a* and two second massage arms 12 arranged at the other side of the stimulation chamber 100*a*. The support members 11*a* of the two first massage arms 11 are arranged spaced from each other and connected together by a first beam 11*c* at bottom ends. The support members 11*a* of the two first massage arms 11 are connected to a common slider 13 through the first beam 11*c*. The support members 12*a* of the two second massage arms 12 are arranged spaced from each other and connected together by a second beam 12*c* at bottom ends. The support members 12*a* of the two second massage arms are connected to a common slider 13 through the second beam 12*c*.

Referring to FIGS. 6 to 11, the sex toy 100 further includes a flexible cover 6, the flexible cover 6 is a one-piece component. Preferably, the flexible sleeves are integrally formed with the flexible cover 6, i.e., as a single-piece structure. The flexible cover 6 may be formed by injection molding. The at least two massage arms 11, 12 are partially disposed within the flexible cover 6. The one-piece flexible cover 6 has better integrity, higher sealing, better product consistency and aesthetics, and is beneficial to product sales and user experience.

Referring to FIGS. 12 to 17, which shows a sex toy 100 according to a third embodiment according to the present disclosure. The sex toy 100 includes an outer tube 7 and an inner tube 8 disposed inside of the outer tube 7. The inner tube 8 is hollow and defines a stimulation chamber **100*a* therein for receiving a male penis. In this embodiment, the stimulation chamber 100*a* is cylindrical. The inner tube 8 includes soft materials at least facing toward the stimulation chamber 100*a*. An accommodating chamber 100*b* is formed between the outer tube 7 and the inner tube 8. The at least two massage arms 11, 12 is disposed in the accommodating chamber 100*b*, and the first massage arm 11 and the second massage arm 12 being disposed on radial opposite sides of the inner tube 8** respectively.

Exemplarily, the outer tube 7 is substantially a hollow cylindrical structure. The inner tube 8 is entirely made of soft materials. The soft materials include but are not limited to silicone that is non-toxic, anti-bacterial, and has good chemical stability. The accommodating chamber **100*b* between the outer tube 7 and the inner tube 8 is used to place massage arms 11, 12 and the drive assembly 2. The first massage arm 11 and the second massage arm 12 are respectively disposed on opposite radial sides of the inner tube 8. The guide member 3 may be fixed on the outer tube 7**.

Similar to the second embodiment, the first massage arm 11 and the second massage arm 12 in the present embodiment can slide towards or away from each other. When the first and second massage arms 11, 12 slides towards each other, they press the inner tube 8 inwardly towards the stimulation chamber **100*a*, so as to narrow the radial size of the stimulation chamber 100*a* and pinch the male penis received therein. At least the portions of the inner tube 8 in contact with the first massage arm 11 and the second massage arm 12 are soft and flexible materials to ensure that the radial dimension of the inner tube 8 can be changed, and thus the radial dimension of the stimulation chamber 100*a* can be changed accordingly when the first massage arm 11 and the second massage arm 12 slide relative to each other. Preferably, the inner tube 8 may be entirely made of soft material by molding, for example, injection molding, to ensure that the stimulation chamber 100*a*** has a higher degree of comfort, further improving the using experience of the product.

Figure 14:
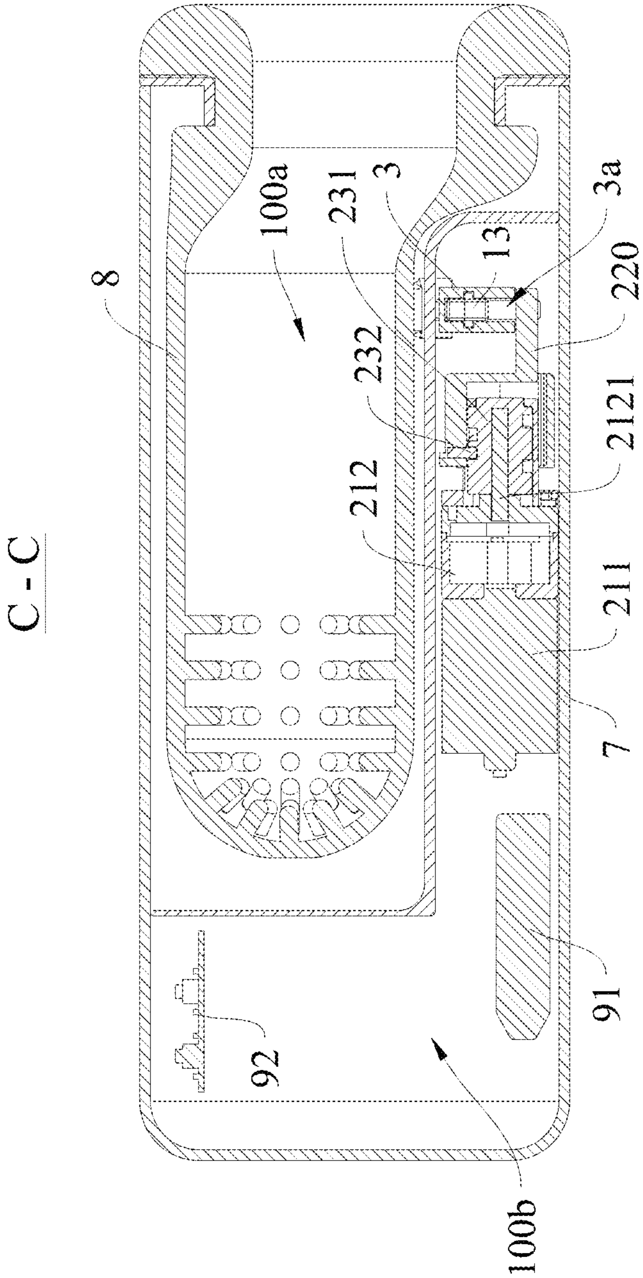
FIG. 14 is a sectional view of the sex toy of FIG. 13, taken along line C-C.
Figure 15:
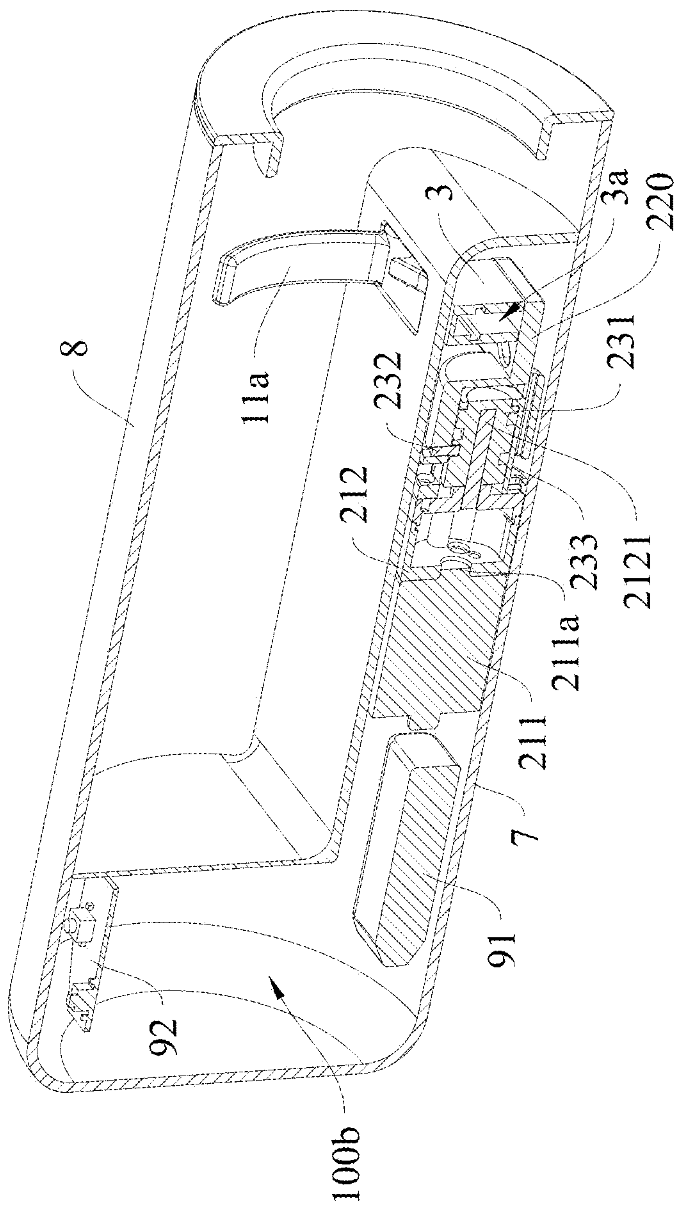
FIG. 15 is a schematic view of the sex toy of FIG. 14 viewed from another aspect, wherein an inner tube is removed for clarity.

In some embodiments, referring to FIG. 14, one longitudinal or axial end of the inner tube 8 is open and the other longitudinal or axial end is closed.

In other embodiments, both longitudinal or axial ends of the inner tube 8 are open. The male penis can extend into the stimulation chamber **100*a*** through either opening at the two longitudinal or axial ends, and the product is more convenient to use.

That is, at least one end of the longitudinal or axial ends of the inner tube 8 is open to allow the insertion of a male penis into the stimulation chamber **100*a*** through the opening.

In some embodiments, referring to FIG. 14, the inner tube 8 is a one-piece component. The integrally molded inner tube 8 has better integrity, higher sealing, better product consistency and aesthetics, and is beneficial to product sales and user experience.

In some embodiments, the inner tube 8 is formed by at least two ring structures that are joined end-to-end in the longitudinal direction. In other words, the inner tube 8 may also be formed by connecting a plurality of ring sections one above another along the longitudinal direction. As such, when the internal structure of the inner tube 8 is more complex, for example, the inner tube 8 with inconsistent wall thicknesses, axial bending, and other forms of the inner tube 8, the use of ring sections may facilitate the processing and manufacturing of the product, and reduce the cost of the production of the inner tube 8.

Figure 17:
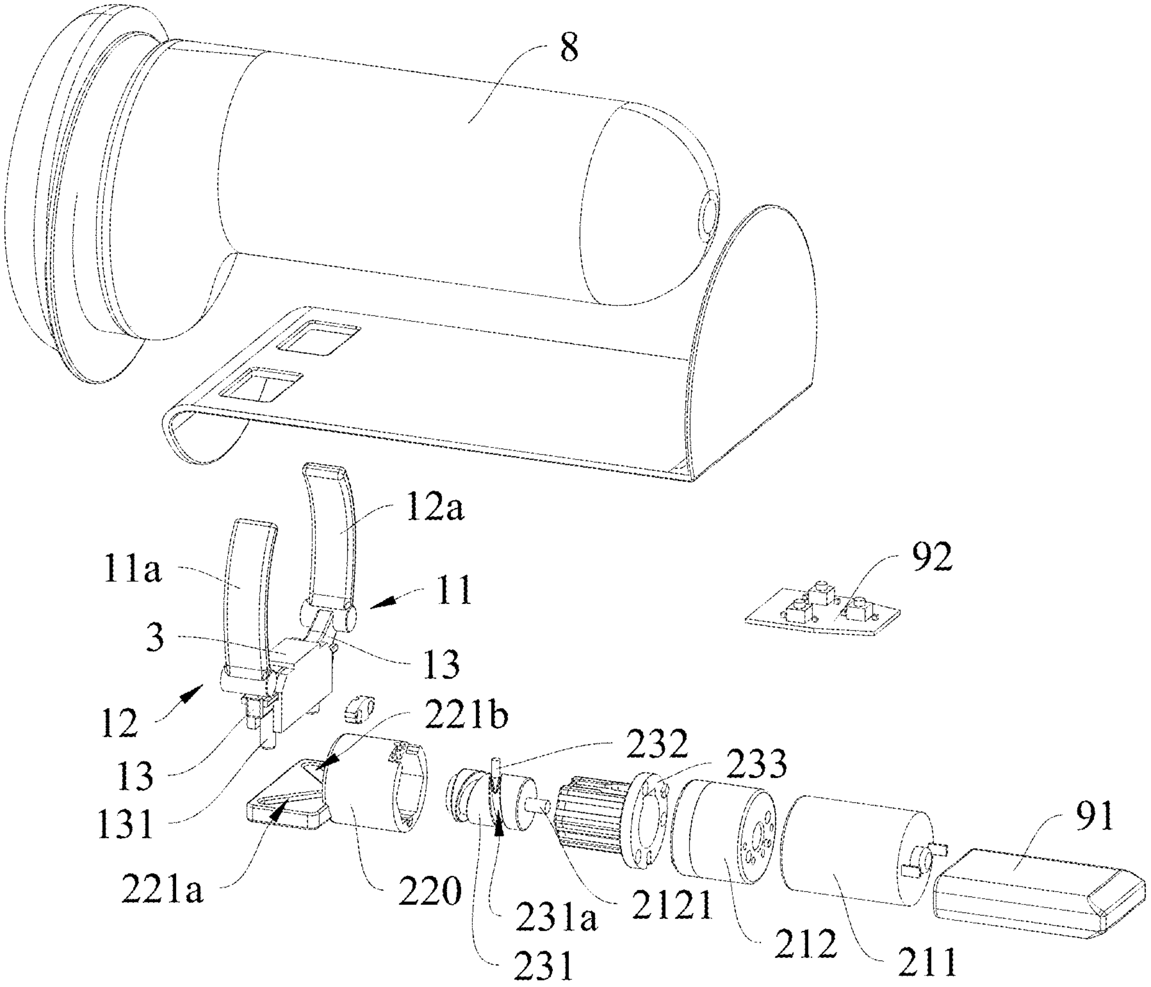
FIG. 17 is a further exploded view of the sex toy of FIG. 16, wherein main structures of the inner tube, a drive assembly, and a massage arm are shown schematically.

In some embodiments, referring to FIG. 10 and FIG. 17, the sex toy 100 further includes a battery 91 and a control board 92. The control board 92 is electrically connected to the drive assembly 2. The battery 91 is electrically connected to both the control board 92 and the drive assembly 2, so that the user can perform control operations such as switching ON, switching OFF, and regulating the mode, in particular, the speed of the drive assembly 2 by means of the control buttons on the control board 92. The battery 91 is used to supply power to the control board 92 and the drive assembly 2. The battery 91 may be a removable battery 91 for easy replacement by the user; the battery 91 may also be a rechargeable battery 91 fixedly disposed within the sex toy 100.

In some embodiments, referring to FIGS. 6 to 11, the battery 91 and the control board 92 are received in the housing 4. The control board 92 is disposed on the side of the drive assembly 2 away from the massage arms 11, 12. The battery 91 is disposed on the radial side of the drive assembly 2.

In some embodiments, referring to FIGS. 12 to 17, the battery 91 and the control board 92 are received in the accommodating chamber **100*b*. The battery 91 is disposed on the side of the drive assembly 2 away from the massage arm 11, 12, and the control board 92 is disposed on the longitudinal side of the inner tube 8**.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sex toy having a stimulation chamber extending along a longitudinal direction for accommodating a male penis, the sex toy comprising:

at least two massage arms, the at least two massage arms comprising a first massage arm and a second massage arm respectively arranged on opposite sides of the stimulation chamber; and a drive assembly, in torque-transmission connection with the at least two massage arms, for driving the first massage arm and the second massage arm to slide towards or away from each other, thereby changing a radial dimension of the stimulation chamber at a portion corresponding to the first massage arm and the second massage arm.

2. The sex toy according to claim 1, wherein the drive assembly comprises a drive mechanism having a rotation output shaft, and a push member, the rotation output shaft drives the push member to move along the longitudinal direction when rotating, and each of the first massage arm and the second massage arm comprises at least one slider slidably engaged with the push member such that the push member drives the sliders to slide in the radial direction when the push member moves in the longitudinal direction.

3. The sex toy according to claim 2, wherein the push member is slidably engaged with each slider via a slot and a protrusion, the slot is defined in one of the push member and a corresponding slider, and the protrusion is formed on an other of the push member and the corresponding slider, the protrusion is slidably engaged in the slot.

4. The sex toy according to claim 3, wherein each slider is provided with the protrusion, and the push member is provided with a first slot and a second slot respectively corresponding to the protrusions of the sliders of the first massaging arm and the second massaging arm, the first slot and the second slot are both inclined relative to the longitudinal direction, and the first slot and the second slot extend gradually close to each other or gradually away from each other along the longitudinal direction.

5. The sex toy according to claim 4, wherein the first slot and the second slot are arranged in a V shape or a truncated V shape.

6. The sex toy according to claim 2, further comprising a guide member fixedly disposed for guiding sliding direction of the sliders of the first massage arm and the second massage arm, wherein the guide member has a guide slot for receiving the sliders, the guide slot extends substantially in the radial direction.

7. The sex toy according to claim 2, wherein the push member is threadedly engaged with the rotation output shaft, the drive mechanism comprises a motor and a gear assembly, an input end of the gear assembly is in torque transmission connection with a rotating shaft of the motor, the rotation output shaft is configured as an output end of the gear assembly.

8. The sex toy according to claim 1, wherein the sex toy is constructed as a claw-like structure.

9. The sex toy according to claim 8, wherein the sex toy further comprises a housing, the at least two massage arms are disposed on two sides of the housing respectively, one end of each the massage arm is slidably connected to the housing, and distal ends of the first massage arm and the second massage arm extended towards each other, and wherein the at least two massage arms and the housing enclose the stimulation chamber.

10. The sex toy according to claim 9, wherein the distal ends of the first massage arm and the second massage arm are spaced apart from each other.

11. The sex toy according to claim 9, wherein the distal ends of the first massage arm and the second massage arm are connected by a flexible member.

12. The sex toy according to claim 9, further comprising at least one vibration member, wherein one of the at least one vibration members is disposed within one of the at least two massage arms.

13. The sex toy according to claim 9, wherein the massage arms comprise soft materials, the soft materials being disposed on at least one side facing toward the stimulation chamber.

14. The sex toy according to claim 13, wherein the soft materials of the massage arms are flexible sleeves disposed at a periphery of the massage arms.

15. The sex toy according to claim 9, wherein the sex toy comprises a flexible cover, the flexible cover being a one-piece component, the at least two massage arms are partially disposed within the flexible cover.

16. The sex toy according to claim 1, wherein the sex toy comprises an outer tube and an inner tube disposed inside the outer tube, the inner tube comprises a soft material disposed facing toward the stimulation chamber, an accommodating chamber is formed between the outer tube and the inner tube, the at least two massage arms are disposed in the accommodating chamber, and the first massage arm and the second massage arm are disposed on opposite radial sides of the inner tube respectively.

17. The sex toy according to claim 16, wherein two longitudinal ends of the inner tube are both open.

18. The sex toy according to claim 16, wherein one longitudinal end of the inner tube is open, and an other longitudinal end of the inner tube is closed.

19. The sex toy according to claim 16, wherein the inner tube is a one-piece component and entirely made of soft material.

20. The sex toy according to claim 1, wherein the at least two massage arms comprise another first massage arms arranged at one side of the stimulation chamber adjacent to the first massage arm, and another second massage arm arranged at an other side of the stimulation chamber adjacent to the second massage arm, the two first massage arms are connected to a first common slider, the two second massage arms are connected to a second common slider, and wherein the drive assembly comprises a drive mechanism having a rotation output shaft, and a push member threadedly engaged with the rotation output shaft, the rotation output shaft drives the push member to move along the longitudinal direction when rotating, and the push member is provided with a first slot and a second slot engageable with the first common slider and the second common slider, respectively.

* * * * *